2,917,503
VAPOR PHASE SULFURIZATION OF OLEFINIC HYDROCARBONS

Roy P. Daniels, Port Arthur, Tex., assignor to Gulf Oil Corporation, Pittsburgh, Pa., a corporation of Pennsylvania No Drawing. Application December 16, 1957
Serial No. 702,785

5 Claims. (Cl. 260—139)

This invention relates to the sulfurization of olefins and more particularly to a continuous process for the sulfurization of olefins in the vapor state.

In the conventional procedure for sulfurizing olefins the olefinic starting material, for example, isobutylene, diisobutylene, a cracked gasoline fraction or the like, is contacted as a liquid with solid sulfur at reaction temperature in a batch operation. The chief result is an addition reaction of the olefin and elemental sulfur. The sulfurization products have a number of important uses, among which can be mentioned use as extreme pressure additives for cutting oils and other lubricants and use as chemical intermediates in the preparation of various organic compounds of sulfur.

The use of solid sulfur as the sulfurizing agent in the conventional procedure makes continuous operation impracticable. Vaporization of elemental sulfur has not been feasible for most sulfurization reactions because its vaporization temperature is above the decomposition temperature of many olefins or above the decomposition temperature of the sulfurization products. I have now developed a sulfurization method whereby the use of solid sulfur as the sulfurizing agent is avoided and whereby the sulfurization is carried out continuously instead of by the batch method of the prior art. The sulfurization is carried out in the vapor phase in the presence of a catalyst at temperatures below the decomposition temperature of the olefins or of the sulfurization products, with streams of the reactants being continuously introduced into the reaction zone and a product stream being continuously withdrawn.

Besides the economic desirability of continuous operation as compared with batch, my process has another advantage over liquid phase batch sulfurizations. A number of different sulfur compounds can be formed in the reactions of hydrocarbons and elemental sulfur, among which can be mentioned sulfides or thioethers, mercaptans, cyclic sulfides, disulfides and polysulfides. Certain conditions of temperature and residence time in the reaction zone will favor the production of certain compounds. In a batch sulfurization the temperature of the reactants is raised from atmospheric conditions to an elevated reaction temperature over a considerable period of time. As a result, a number of different sulfur compounds can be formed. In contrast, in my continuous process, the reactants can be contacted in the reaction zone at only the desired temperature and for the desired residence time by control of reactor temperature and space velocity. This increases the possibility of obtaining a uniform sulfurization product.

My process in general comprises continuously contacting in the vapor phase a stream of an olefinic hydrocarbon having from 4 to 30 carbon atoms in the molecule with a gaseous mixture of sulfur dioxide and hydrogen sulfide at a temperature from 300 to 800° F. and in the presence of a sulfurization catalyst and continuously recovering a reaction product of the olefin and sulfur.

The substances sulfurized in my process are olefins. I use the term "olefins" in its generic sense to include aliphatic hydrocarbons having one or more double bonds. The particular olefins sulfurized in the process are those which are liquid at standard conditions and that can be vaporized under the sulfurization reaction conditions without thermally decomposing and form sulfurization products that do not decompose under the conditions of the process. These include olefins having from 4 to 30 carbon atoms in the molecule and are typified by the olefins found in unsaturated petroleum fractions such as thermally and catalytically cracked naphthas and gas oils. Especially suitable olefins include isobutylene, diisobutylene and heptene. The olefinic charge can be a single highly purified olefin having from 4 to 30 carbon atoms or a mixture of two or more such olefins, or it can be a mixture of one or more olefins with minor amounts of other hydrocarbons of similar boiling range such as paraffins, an example of such a mixture being a cracked naphtha fraction.

The sulfurization agent for my process is a gaseous mixture of hydrogen sulfide and sulfur dioxide. These compounds react according to the equation, $$2H_2S + SO_2 = 2H_2O + 3S$$

to produce steam and free sulfur. The relative amounts of $H_2S$ and $SO_2$ in this gaseous mixture and the relative proportion of this mixture and the olefinic starting material can vary considerably depending on the particular olefin being sulfurized and the sulfurization product desired. There should be enough of the gaseous mixture of hydrogen sulfide and sulfur dioxide to provide at least one mol of sulfur per mol of olefin in the charge. However, in some sulfurization reactions two or more mols of sulfur per mol of olefins can be reacted. The reaction equation above shows that hydrogen sulfide and sulfur dioxide react in a 2:1 molar ratio. Therefore, no more than about 2 mols of hydrogen sulfide per mol of sulfur dioxide will be used. However, considerably less than two mols of hydrogen sulfide per mol of sulfur dioxide can often be used because in many sulfurization reactions hydrogen sulfide is evolved as a product. The evolved hydrogen sulfide can react with sulfur dioxide to yield sulfur. In such reactions somewhat less hydrogen sulfide than two mols per mol of sulfur dioxide can be supplied with the gaseous mixture. Even in this case, however, at least one mol of hydrogen sulfide per mol of sulfur dioxide should be charged to the reaction zone.

The use of a catalyst is essential in my process but a wide range of catalysts can be used. I prefer bauxite but many other solid catalysts of high surface area can be employed, among which can be mentioned the oxides and sulfides of iron, copper, nickel, aluminum and manganese. These can be employed alone or on a suitable carrier such as activated alumina, silica gel or silica-alumina composites. The catalyst can be employed in a fixed bed in the form of pellets or granules or can be employed in a finely divided state in a fluidized bed according to well-known procedures.

The process can be carried out over a temperature range from about 300 to 800° F. The particular temperature will depend on the olefin being sulfurized, the catalyst employed and the type of product desired. In any event, the temperature must be high enough to give a satisfactorily rapid reaction rate and low enough to avoid thermal decomposition of the hydrocarbons or of the products. The space velocity will be selected according to similar considerations. If a very active catalyst and high temperatures are used to provide a rapid reaction rate the space velocity can be reasonably high, for example, as high as 10 liquid volumes of olefin per volume of catalyst per hour or even much higher. At lower reaction temperatures or with less active catalysts a lower space velocity, for instance, 1 liquid volume of olefin per volume of catalyst per hour, will be employed.

The process is preferably carried out at or near atmospheric pressure. However, subatmospheric pressure can be used to provide vaporization at reasonably low temperatures. If desired, pressures as high as 500 or 600 pounds per square inch gauge can be employed in sulfurization of the lower molecular weight olefins.

A further understanding of my invention can be obtained from the examples of particular sulfurizations that have been carried out by my new procedure.

*Example 1*

The olefinic charge was a heptene fraction having an initial boiling point of 184° F., an end point of 200° F. and a gravity of 67.2° A.P.I. The fraction contained 96.4 volume percent olefins, 3.6 volume percent saturates and 0.001 percent sulfur. This stock was charged to a preheater in advance of the catalytic reactor. A gaseous mixture of hydrogen sulfide and sulfur dioxide in a volume ratio of about 2:1 was simultaneously charged to the preheater. The temperature of these reactant streams was raised to 550° F. in the preheater. The streams then entered the catalytic reactor, maintained at about 650° F. and atmospheric pressure and containing a granular bauxite catalyst. The heptene fraction was charged at a space velocity of 4 liquid volumes per volume of catalyst per hour. The charge rates of hydrogen sulfide and sulfur dioxide were 1000 and 480 volumes of vapor per volume of catalyst per hour, respectively. The reactor effluent vapor stream was passed through a water cooled condenser. The condensate was collected and the uncondensed gas was vented. The uncondensed gas consisted principally of hydrogen sulfide but contained minor amounts of light hydrocarbons and carbon dioxide. The yield of condensate amounted to 73.4 volume percent based on the olefin charged. This liquid was distilled to separate unconverted hydrocarbons from the sulfurized product. A 78% distillate fraction and a 22% bottoms fraction were obtained. The distillate, having a gravity of 66.0° API, color of 1.0 (ASTM, Union), sulfur content of 0.7 weight percent, an initial boiling point of 184° F. and a 95 percent point of 219° F., consisted substantially entirely of hydrocarbons and 92.5 percent of the hydrocarbon content was olefinic. The 22 percent bottoms, which was the sulfurized product, was a dark red liquid. It had the following characteristics: Sulfur content, 19.63 weight percent; gravity, 20.3° API; color, 8+ (ASTM, Union); pour point below −60° F.; and copper strip test rating of 4 after three hours at 212° F.

The heptene fraction of Example 1 has been sulfurized in other runs in accordance with my procedure as described in Example 1 but with variations in reaction conditions within the ranges of my invention. These runs are described in Examples 2–4 and, except as otherwise indicated, the procedure and conditions were the same as in Example 1.

*Example 2*

Reactor temperature was maintained in the range 550–580° F. The yield of liquid product (dark red liquid, color, ASTM Union: 6.0; gravity: 61.3° API; sulfur content: 2.4 weight percent) was 77.2 volume percent. Distillation of this liquid produced an 88 percent distillate fraction and a 12 percent bottoms fraction. The olefinic distillate had a gravity of 66.0° API, a color of 1.0 (ASTM, Union) and a sulfur content of 0.70 weight percent. The bottoms fraction, which was the concentrated sulfurization product, had a gravity of 20.4° API, a color of 8+ (ASTM, Union) and a sulfur content of 19.6 weight percent.

*Example 3*

Reactor temperature was maintained in the range 580–625° F. The yield of liquid product (dark red liquid, color, ASTM Union: 7.0; gravity: 60.0° API; sulfur content: 3.9 weight percent) was 75.4 volume percent. Distillation of this liquid produced a 79.8 percent distillate fraction and a 20.2 percent bottoms fraction. The olefinic distillate had a gravity of 66.0° API, a color of 1.0 (ASTM, Union) and a sulfur content of 0.68 weight percent. The bottoms fraction, which was the concentrated sulfurization product, had a gravity of 20.6° API, a color of 8+ (ASTM, Union) and a sulfur content of 19.3 weight percent.

*Example 4*

Reactor temperature was maintained in the range 690–715° F. The heptene fraction was charged at a space velocity of 4.44 liquid volumes per volume of catalyst per hour. The yield of liquid product (dark red liquid, color, ASTM Union: 7.0; gravity: 57.6° API; sulfur content: 4.2 weight percent) was 68.5 volume percent. Distillation of this liquid produced an 80 percent distillate fraction and a 20 percent bottoms fraction. The olefinic distillate had a gravity of 66.0° API, a color of 1.0 (ASTM, Union) and a sulfur content of 0.70 weight percent. The bottoms fraction, which was the concentrated sulfurization product, had a gravity of 21.3° API, a color of 8+ (ASTM, Union) and a sulfur content of 17.5 weight percent.

*Example 5*

Sulfurization of a diisobutylene fraction was performed in substantially the same way as described in Example 1. The diisobutylene charge stock was a fraction boiling from 210° to 216° F. and was substantially entirely olefinic. A stream of the diisobutylene fraction was preheated to 600° F. with a gaseous mixture of hydrogen sulfide and sulfur dioxide, the latter being in a volume ratio of 2:1, and the combined streams were charged to the catalytic reactor containing granular bauxite catalyst and maintained at about 650° F. and atmospheric pressure. The diisobutylene was charged at a space velocity of 2.67 liquid volumes per volume of catalyst per hour. The sulfur dioxide was charged at a space velocity of 240 gaseous volumes per volume of catalyst per hour. Hydrogen sulfide was charged at a space velocity of 480 gaseous volumes per volume of catalyst per hour. The reactor effluent was passed through a water cooled condenser. The yield of condensate was 83.3 percent. It had a gravity of 44.9° API, an ASTM Union color of 7.0, and a sulfur content of 8.22 weight percent. The condensate was distilled to obtain a 76 percent olefinic distillate and a 24 percent bottoms. The bottoms, which was the concentrated sulfurized product, was a dark red liquid and had the following characteristics: Sulfur content, 42.41 weight percent; specific gravity, 1.087; viscosity, S.U.V. at 100° F., 43.0 seconds; pour point, −40° F.; copper strip test rating of 4 after 3 hours at 212° F.

The diisobutylene fraction of Example 5 has also been sulfurized in other runs in accordance with my procedure as described in Example 5 but with variations in reaction conditions within the ranges of my invention. These runs are described in Examples 6–8. Except as otherwise indicated, the procedure and conditions were the same as in Example 5.

*Example 6*

Reactor temperature was maintained in the range 580–650° F. The diisobutylene was charged at a space velocity of 2.44 liquid volumes per volume of catalyst per hour. The yield of liquid product was 74.6 volume percent. The liquid had the following properties: Color, ASTM Union: 6.0; gravity: 56.8° API; and sulfur content: 3.78 weight percent.

*Example 7*

Reactor temperature was maintained in the range 735-760° F. The yield of liquid product was 72.3 volume percent. The liquid had the following properties: Color, ASTM Union: 7.0; gravity: 45.0° API; and sulfur content: 7.02 weight percent.

*Example 8*

Reactor temperature was maintained in the range 740–755° F. The diisobutylene was charged at a space velocity of 2.48 liquid volumes per volume of catalyst per hour. The yield of liquid product was 72.7 volume percent. This liquid had the following properties: Color, ASTM Union: 7.0; gravity: 45.5° API; and sulfur content: 6.95 weight percent.

The above examples demonstrate the success of my novel method of continuous vapor phase sulfurization of olefins. In Example 1 a concentrated liquid sulfurization product containing 19.6 percent sulfur was obtained. In Example 5 a concentrated liquid product containing 42.4 percent sulfur was obtained. Although the liquid products were not concentrated by distillation in Examples 6–8, the sulfur contents of the dilute products shows that extensive sulfurization occurred and that a concentrated product of very high sulfur content could have been obtained by distilling off the unreacted olefin.

In the runs described in the examples the yields of sulfurization product were good for single-pass operation. The distillate separated from the sulfurized product in Examples 1–5 was entirely or almost entirely olefinic. In a preferred modification of my process this olefinic distillate is recycled to the reactor as a portion of the reactor charge stock. By thus recycling the unconverted olefins the yield of sulfurized product can be greatly increased over the values shown in the examples.

The use of a catalyst is essential in my process. I have contacted olefins such as described in the examples with hydrogen sulfide and sulfur dioxide at the optimum reaction conditions of my process, but in the absence of a catalyst. Although sulfur was produced, no substantial sulfurization of the olefins occurred. The preferred catalyst and the one used in the examples above is bauxite. However, as I have stated, many other catalysts can be used.

Obviously many modifications and variations of the invention as hereinbefore set forth may be made without departing from the spirit and scope thereof and therefore only such limitations should be imposed as are indicated in the appended claims.

I claim:

1. The sulfurization process which comprises continuously contacting in the vapor phase a stream of an olefinic hydrocarbon having from 4 to 30 carbon atoms in the molecule with a gaseous mixture of sulfur dioxide and hydrogen sulfide at a temperature from 300 to 800° F. in the presence of a catalyst from the group consisting of bauxite, the oxides and sulfides of iron, copper, nickel, aluminum and manganese and said oxides and sulfides on a carrier from the group consisting of activated alumina, silica gel and silica-alumina composites, and continuously recovering a reaction product of the olefin and sulfur.

2. The sulfurization process which comprises continuously charging to a reaction zone containing a bauxite catalyst and maintained at a temperature from 300 to 800° F. a vaporized olefinic charge stock consisting essentially of olefins having from 4 to 30 carbon atoms in the molecule and a gaseous mixture of hydrogen sulfide and sulfur dioxide, the charge rate of said mixture relative to that of said olefinic charge stock being sufficient to provide at least one mol of sulfur per mol of olefin in said charge stock and said mixture containing at least one mol of hydrogen sulfide per mol of sulfur dioxide, cooling the reactor effluent to condense the normally liquid components thereof, fractionating the condensate, recovering an unsulfurized olefinic fraction and a sulfurized fraction and recycling said unsulfurized olefinic fraction to said reaction zone as a portion of said charge stock.

3. The sulfurization process which comprises continuously charging to a reaction zone containing a bauxite catalyst and maintained at a temperature from 300 to 800° F. and atmospheric pressure a vaporized olefinic charge stock consisting essentially of a material selected from the group consisting of diisobutylene and heptene and a gaseous mixture of hydrogen sulfide and sulfur dioxide, the charge rate of said latter mixture relative to that of said olefinic charge stock being sufficient to provide at least one mol of sulfur per mol of olefin in said charge stock, said mixture containing from one to two mols of hydrogen sulfide per mol of sulfur dioxide, and continuously recovering a reactor effluent comprising sulfurized olefin.

4. The sulfurization process which comprises continuously charging to a reaction zone containing a bauxite catalyst and maintained at a temperature from 550° to 715° F. and atmospheric pressure a vaporized heptene fraction charge stock and a gaseous mixture of hydrogen sulfide and sulfur dioxide, the charge rate of said latter mixture relative to that of said heptene fraction being sufficient to provide at least one mol of sulfur per mol of olefin in said heptene fraction, said mixture containing from one to two mols of hydrogen sulfide per mol of sulfur dioxide, and continuously recovering a reactor effluent comprising sulfurized heptene.

5. The sulfurization process which comprises continuously charging to a reaction zone containing a bauxite catalyst and maintained at a temperature from 580° to 760° F. and atmospheric pressure a vaporized diisobutylene fraction charge stock and a gaseous mixture of hydrogen sulfide and sulfur dioxide, the charge rate of said latter mixture relative to that of said diisobutylene fraction being sufficient to provide at least one mol of sulfur per mol of olefin in said diisobutylene fraction, said mixture containing from one to two mols of hydrogen sulfide per mol of sulfur dioxide, and continuously recovering a reactor effluent comprising sulfurized diisobutylene.

References Cited in the file of this patent

UNITED STATES PATENTS

| | | |
|---|---|---|
| 2,450,659 | Hansford et al. | Oct. 5, 1948 |
| 2,787,613 | Fields | Apr. 2, 1957 |